Dec. 10, 1963 R. W. AVERY 3,114,035

FORM-READING AND INFORMATION-CONVERTING APPARATUS

Filed June 22, 1961

INVENTOR
ROBERT W. AVERY

BY Henry E Otto Jr.

ATTORNEY

United States Patent Office 3,114,035

Patented Dec. 10, 1963

3,114,035

FORM-READING AND INFORMATION-CONVERTING APPARATUS

Robert W. Avery, Haddonfield, N.J., assignor to International Business Machines Corporation, New York, N.Y., a corporation of New York Filed June 22, 1961, Ser. No. 118,990
8 Claims. (Cl. 235—61.11)

Figure 1:
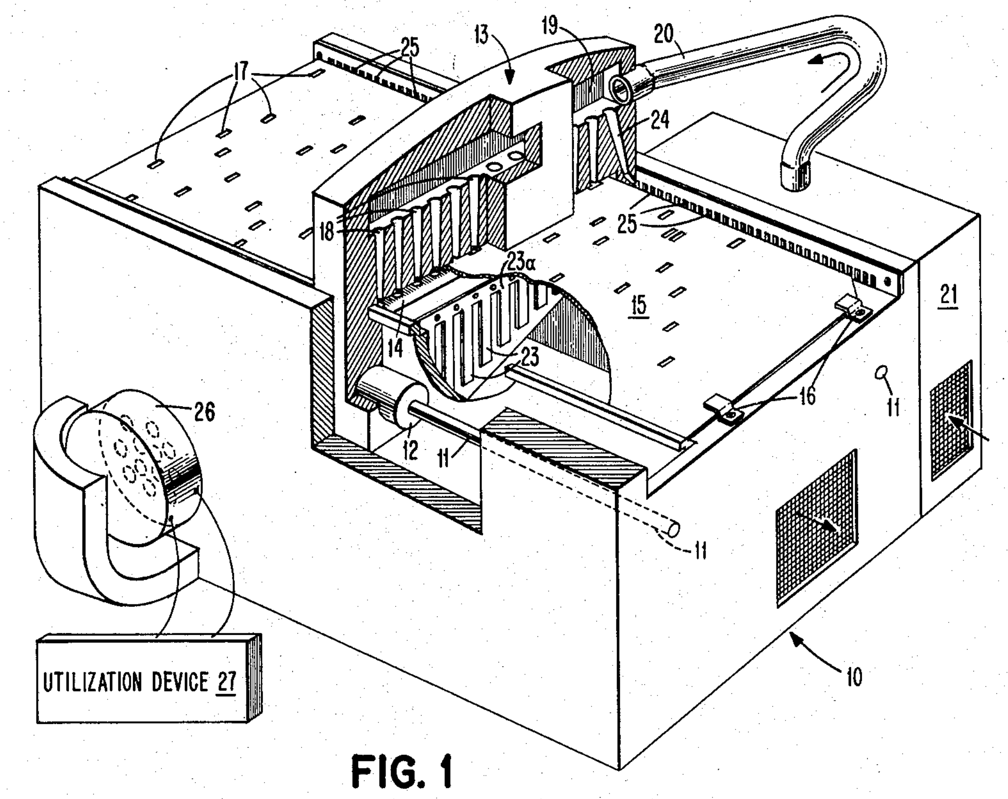

This invention relates to apparatus for reading information from record forms, and relates more particularly to apparatus for reading coded information represented by perforation patterns in a form, and converting such information into tones or tunes of correspondingly distinctive frequencies that serve as the input to a utilization device capable of responding to such converted information.

It has heretofore been proposed to use pneumatic sensing means which, when a perforation is detected in a record, delivers air at atmospheric or superatmospheric pressure through the perforation to actuate a pneumatically controlled mechanism, such as a typewriter key or a fluid pressure motor. However, none of these previously proposed arrangements embody means for translating or converting the sensed information into a series of distinctive sequential tones which can be readily transmitted by conventional transmission means, such as by telephone, radio or the like, over great distances at relatively low cost to control a remote utilization device.

It is therefore the principal object of this invention to provide apparatus for reading information from record forms and converting such information into tones or tunes of distinctive frequencies transmissible in the manner and for the purposes just stated.

Another object is to provide an apparatus of the above general type wherein a special indexing tone is transmitted either after or at the same time as each successive line of the record form is read so that the utilization device will be advised as each line is read, even if there is no other perforation or tone-producing information on such line. This will assure that operations of the utilization device and form-reading apparatus are properly synchronized.

The foregoing and other objects, features and advantages of the invention will be apparent from the following more particular description of a preferred embodiment of the invention, as illustrated in the accompanying drawing.

Figure 2:
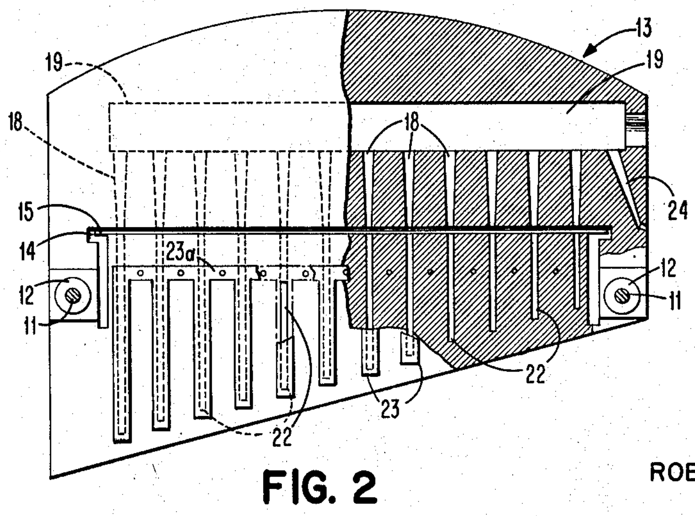

In the drawing:

FIG. 1 is a perspective view, partially broken away, of a form-reading and information-converting apparatus embodying the invention; and FIG. 2 is a vertical section view, to enlarged scale, of a reading or sensing member forming part of such apparatus.

As illustrated in the drawing, the apparatus embodying the invention comprises a stationary hollow rectangular support structure 10 open at the top. Parallel guide bars 11 supported by the ends of the structure pass through bushings 12 in a member 13 to support the member and guide its rectilinear movement relative to the structure. Member 13 has a slit 14 of such width and height as to accommodate with slight clearance a record, such as a conventional 80-column 12-row record card 15. A short edge of this card 15 is inserted from one end of the structure 10 so as to pass through the slit 14 and then under clips or clamps 16 which are affixed to the opposite end of the structure and clamp down said edge to hold the card stationary.

Member 13 is provided to pneumatically read information represented by patterns of perforations 17 in the card 15 and convert such information into tones of distinctive frequencies. Since the member 13 moves parallel to the long dimension of the card, the card will be read serially; that is, one column at a time, with all twelve digit bits or rows of each column being read concurrently. Hence, member 13 has twelve ports 18 each opening through the upper surface of slit 14 and arranged side-by-side to read or sense concurrently any and all perforations 17 in the twelve rows of a particular column. Air at relatively low pressure and high volume is supplied to the ports 18 from a manifold 19 that, in turn, is connected by flexible tubing 20 to a suitable blower (not shown) enclosed in a housing 21.

Below each port 18 is the mouth of a corresponding tuned resonant chamber 22, each such mouth opening through the lower surface of slit 14. Each chamber is of different volume and has a portion which opens through the front side of the member 13. Each such portion is covered by a suitable overlying reed 23 so that when a perforation 17 registers with a particular port 18 and its corresponding chamber 21, air will flow to such chamber and vibrate the corresponding reed to produce a tone of a frequency characteristic only of the particular chamber and hence only of a perforation in that particular corresponding row of the card. The various reeds 23 may be joined, in the manner of fingers, to a common cross piece *23a* pinned to the front side of member 13, as shown.

The member 13 preferably has an additional port 24 that extends from the manifold 19 and opens through the side of member 13 so as to be capable of registering with, and delivering air to, each of eighty holes 25 in succession as the member 13 reads and advances past each of the eighty columns of a card. When air is supplied to any one of these holes 25, a special tone is produced which is the same tone no matter which of said holes is involved. The holes 25 may be so positioned relative to the ports 18 and 24 that the special tone is given after each column is read (i.e., between columns and after the information-representing tones are given by air admitted via perforations 17 to the tuned resonant chambers 22); or, if preferred, the special tone may be given at the same time as the columns are read, such that if perforations 17 are read in a particular column, the special tone will be superimposed on the information-representing tone or tones. This special tone will thus be given intermittently and at the same time as or just after each successive column is read, irrespective of whether such column contains any perforations 17 representing bits of coded information.

The information-representing tones and special tone are picked up by a suitable sound transmitter, such as a microphone 26 which via suitable wires transmits a series of successive variable and amplified tonal signals as an input or control "tune" for controlling operation of a dependent utilization device 27. If preferred, the control signals or tunes may be transmitted by radio waves or telephone lines in cases where the utilization device 27 is remote from the card-reading and information-converting apparatus above described.

The utilization device 27 may be a card or tape punching machine, a typewriter, a computer, a magnetic tape recording unit, or any other device provided with means responsive to tones of varying frequency to perform desired operations.

The special tone is given while or after each successive column of the card is read so that the utilization device 27 will be controlled accordingly. For example, if the utilization device is a duplicating card punch which is to provide an exact replica of the punched card read by the member 13, it is imperative that the duplicating punch know what column is being read so that the information will be duplicated in the proper column of the card to be punched. Accordingly, as each special tone is received, a card indexing mechanism (not shown) associated with the duplicating punch would be actuated automatically to advance the card one column relative to the punch station. This special tone thus assures that the rate of operation of the utilization device 27 is automatically synchronized with the reading rate of member 13; in other words, reading can be spasmodic or uniform, without requiring subtle adjustments to match the card feed speed of the duplicating punch with the speed of member 13 of the reading apparatus.

In the simplified embodiment illustrated, the card-reading and information-converting member 13 has been shown as manually movable translationally to read a stationary record card 15. However, it will be apparent that, if preferred, the member 13 may be moved automatically by a suitable motor (not shown); or the member may be maintained stationary and a record card or tape moved therepast by suitable feed means (not shown). Also, the port 24 may, if desired, be parallel to the ports 18 and disposed over a resonant chamber similar to chambers 22 to produce the distinctive special tone; in such case, the card or tape would have to be provided with an extra indexing or timing row which would be punched in every column position so that the special tone would be given as each column is read. Alternatively, port 24 and holes 25 could be eliminated, and one of the twelve rows of a conventional record card used as the indexing row; in such case, a hole would be punched in said row at every column of the card.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for controlling operation of an electronic computational device according to information represented by perforations in a record, said apparatus comprising a structure for holding the record stationary, reading means and converting means disposed at opposite sides of the record and slidably movable translationally to read parallel columns of the record successively and read all digit positions in each column concurrently, said reading means including means to direct a stream of pressurized air through any perforation existing in the column being read, and said converting means comprising means to convert the energy of any such air stream into tones of different frequencies each characteristic of and corresponding to the particular digit position of the perforation through which such stream is directed, means for pneumatically producing a distinctive special tone as each successive column is read thereby to apprise the device that such column has been read, and means for transmitting such tones to the computational device to control operation of the latter in conformity therewith.

2. Apparatus for controlling operation of an electronic computational device according to information represented by perforations in a record, said apparatus comprising a stationary structure for holding the record, reading means and converting means disposed at opposite sides of the record and movable to read columns of the record successively and read all digit positions in each column concurrently, said reading means including means to direct a stream of pressurized air through any perforation existing in the column being read, and said converting means comprising means to convert the energy of any such air stream into tones of different frequencies each characteristic of and corresponding to the particular digit position of the perforation through which such stream is directed, means for transmitting such tones to the utilization device to control operation of the latter in conformity with the perforate information in the record, said structure providing a plurality of apertures equally spaced apart on centers corresponding to the distances between columns of the record and disposed adjacent one edge of the record, and means to direct a stream of air intermittently through successive apertures as the read means is advanced, thereby to produce a special tone which apprises the computational device as each column is read.

3. Apparatus for controlling operation of an electronic computational device according to information represented by patterns of perforations on a record, said apparatus comprising means providing a plurality of tuned resonant chambers pneumatically responsive to produce tones of different frequencies each corresponding to a respective digit position the perforation may occupy along one of a plurality of parallel lines of the record, means for supplying air under pressure to a manifold, said chambers and manifold being at opposite sides of the record such that when any perforation registers with one of the chambers air will flow from the manifold to such chamber, said chambers and manifold being movable relative to the record in a plane at right angles to said lines to read perforations in all digit positions of each line concurrently and read perforations in successive lines sequentially, means providing a plurality of apertures equally spaced apart on centers corresponding to the distances between lines of perforations in the record and disposed adjacent one edge of the record, and means to direct a stream of air intermittently through successive apertures as the chambers and manifold are moved, thereby to produce a special tone as each line is read and produce a series of tones for controlling operation of the computational device.

4. Apparatus for controlling operation of an electronic computational device according to information punched in various lines of a record storage, said apparatus comprising means for pneumatically reading bits of coded punched information line-by-line from the record storage, means for converting the information as it is read into tones of various frequencies corresponding to such information, means pneumatically producing a distinctive special tone as each successive line is read thereby to apprise the device that such line has been read, and means for transmitting this information and special tone to the computational device to control the latter in accordance therewith.

5. Apparatus for controlling operation of an electronic computational device according to bits of coded information represented by perforations stored in a record, said apparatus comprising means for pneumatically sensing perforations in the record by directing a stream of pressurized air through each perforation in a selectable one of a plurality of parallel imaginary lines of the record; means for converting the energy of such air streams into tones of distinctive frequencies each characteristic of the particular digit position such perforation occupies along such lines; means for effecting movement of the sensing means and converting means relative to the record in a plane at right angles to said lines such that perforations in all digit positions of each line will be sensed concurrently and those in consecutive lines sensed sequentially; and means pneumatically producing a distinctive special tone as each successive line is read thereby to apprise the device that such line has been read, whereby a plurality of tones will be provided for controlling operation of the device.

6. Apparatus for controlling operation of an electronic computational device according to coded information represented by perforations in a record, said apparatus comprising means for directing air under pressure against one side of the record; means at the opposite side of the record to receive such directed air whenever a perforation is present anywhere in a selectable one of a plurality of parallel imaginary lines of the record, the last-named means being operative to produce tones of different frequencies each corresponding to the particular digit position the perforation occupies along such lines; means for effecting relative movement between said last-named means and the record in a plane at right angles to said lines such that perforations in all digit positions of the selected line will be detected concurrently and those in the other lines detected sequentially; and means pneumatically producing a distinctive special tone as each successive line is read thereby to apprise the device that such line has been read, whereby a plurality of sequential tones will be provided for controlling operation of the computational device in accordance therewith.

7. A method of controlling operation of an electronic computational device, comprising the steps of punching into a record storage bits of coded information in the form of punched holes, pneumatically sensing this coded information line-by-line sequentially by directing streams of pressurized air concurrently through the respective punched holes of each successive line, converting the energy of these air streams by respective tone-producing means into varying tones representative of different combinations of bits of coded information in each such line, the holes in corresponding digit positions of each line producing similar tones each of a different frequency than the other digit positions on such line, and transmitting these tones to cause operation of the computational device to be controlled in accordance with the coded information sensed from the record storage.

8. A method of controlling operation of an electronic computational device, comprising the steps of punching into a record storage bits of coded information in the form of punched holes, pneumatically sensing this coded information line-by-line sequentially by directing streams of pressurized air concurrently through the respective punched holes of each successive line, converting the energy of these air streams by respective tone-producing means into varying tones representative of different combinations of bits of coded information in each such line, pneumatically apprising the device as each line is read by directing a special stream of pressurized air through a corresponding one of a series of apertures each spaced substantially a line apart, and converting the energy of said special stream by a special tone-producing means into a distinctive special tone which is repeated as each successive line is read.

References Cited in the file of this patent

UNITED STATES PATENTS

| | | |
|---|---|---|
| 359,279 | Parr | Mar. 15, 1887 |
| 2,831,634 | Luhn | Apr. 22, 1958 |
| 2,856,805 | Babicky | Oct. 21, 1958 |